Aug. 16, 1966 V. A. HINDS 3,267,293

CHARACTER RECOGNITION CIRCUIT

Filed April 25, 1963 2 Sheets-Sheet 1

INVENTOR
Virgil A. Hinds

BY John R. Manning
ATTORNEY

Aug. 16, 1966 V. A. HINDS 3,267,293

CHARACTER RECOGNITION CIRCUIT

Filed April 25, 1963 2 Sheets-Sheet 2

United States Patent Office 3,267,293
Patented August 16, 1966

3,267,293
CHARACTER RECOGNITION CIRCUIT
Virgil A. Hinds, Farmers Branch, Tex., assignor to Sperry Rand Corporation, New York, N.Y., a corporation of Delaware
Filed Apr. 25, 1963, Ser. No. 275,587
11 Claims. (Cl. 307—88.5)

This invention relates to a character recognition circuit and more specifically to a video circuit for receiving the output signals from a video amplifier and processing the signals to derive the information contained therein.

The character recognition systems presently known employ a number of different scanning techniques for scanning characters for deriving a characteristic output signal indicative of or peculiar to the particular character scanned. The characteristic output signal is manipulated in such a manner that an indication of the scanned character is derived. One such character recognition system employs a television camera tube such as the vidicon. Although the general principle employed in scanning a scene or picture for television transmission is somewhat similar to scanning a field of characters, circuits utilized to interpret the video signals produced as a result of the scanning beam within the camera tube are quite different.

In scanning a scene or picture for television transmission, the circuits coupled to the output of the camera tube must be capable of preserving the white signals, the black signals, and the various shades of gray that are found in normal scenes that are televised. In character recognition techniques, although the white signals, the black signals and the various shades of gray are still derived (according to the darkness or quality of the printing), the circuits utilized must be capable, in certain instances, of making a decision whether a particular shade of gray is either more white than black and more black than white. The problem of determining which portion of the signal represents a portion of the scanned character is magnified when the characters are smudged and smeared or have smudges appearing between the characters. In addition, when the sampled points of a character are very close together, it becomes difficult to determine the individual signals representing two or more different portions of a scanned character.

While the characters are being scanned, spot sampling techniques are utilized for character identification by sampling the condition of the beam at certain positions with respect to time and determining only whether the spot so sampled would fall into the white category of signals or if the sample were gray enough to fall into the black category of signals. If for any reason it is desirable to retain the "gray" sampled areas, the circuit will readily operate to indicate, by the amplitude of the information pulse, the gray as well as the black areas.

Characters positioned on a record bearing medium may vary in intensity anywhere from a dark color which contrasts greatly with the background to a very light color which tends to merge with the background. In other instances, both the background and the characters may vary in density at the same time. In many cases, the contrast between the character and its background may be such as to permit an easy distinction or identification to the human eye, but to the scanning beam of the camera tube the distinction may be only very slight. In order to match the ability of the human eye to detect these subtle contrasts, the video circuit and contrast control of the present invention must be able to compensate for variations in the general density level of the data (characters) by making a decision for each spot that was sampled whether the sample point was either black or white, and excluding signals for various shades of gray since provision in the circuitry for intermediate signals, other than "black" or "white" signals are not provided for. This does not mean that the various shades of gray in the sampling spot or area technique are excluded but rather are either directed to the character recognition interpreter circuits as a white sample spot or a black sample spot. Thus, the circuit must be able to indicate that the character lines are "black" and the background is "white" for overlapping ranges of viewed light.

Prior art circuits are known wherein electrical means may be employed to manually compensate for the degree of "darkness" between the characters and the background prior to the processing of a batch of documents. In addition, prior art circuits are known which will automatically compensate for the degree of "darkness" between the character and its background by setting a voltage level which is utilized throughout the scan for an entire field of characters. The manual means are undesirable since the variations between the printing on the large number of documents will vary and thus provide a large group of rejected or unread documents. Circuits wherein the contrast is automatically adjusted for the whole field are also undesirable since experience shows that the first character of the field may be lighter or darker than the remaining characters of the field. In addition, the characters may be smudged by having ink portions appear between or even within the characters. To be effective, the circuit must be able to read and interpret a smudged character if any desirable reject rate is to be obtained. Thus, under these techniques the reject rate could be kept low only if all the characters of the field were of the same intensity, which is not the case found in actual practice.

In the processing of invoices as produced by the well known credit card or charge plate, experience shows that the characters within a given field will vary greatly in intensity since different machines have been used to produce the documents, different operators have operated the different machines, different credit plates have been used to produce the documents, and various qualities, grades and thicknesses of paper have been utilized to produce the invoices. Accordingly, the characters upon the invoice may become smeared and in many cases almost unintelligible so that it is desirable that a circuit be utilized to receive the varying output signal from a camera tube, which circuit is capable of operating automatically, continuously, and for each scan of the scanning beam of a camera tube to indicate to the interpreting circuits of the character reader, an intelligible signal capable of translation to another form such as a punching manifestation, other electrical signal, or the like.

Accordingly, it is the principal object of the present invention to improve character scanning techniques.

It is a further object of the present invention to improve character recognition techniques.

It is another object of the present invention to provide a circuit which is capable of producing as much contrast between black and white signals as is practical.

It is still a further object of the present invention to provide a circuit which is capable of deriving an intelligible signal from a smudged character.

It is a still further object of the present invention to provide a circuit capable of quick recovery between closely spaced scan points.

Briefly, the character recognition circuit of the present invention receives a video signal from a video amplifier, whose output is derived as a result of scanning a field of character bearing documents. A beam blanking stage is coupled to the initial amplifier stage which is capable of removing the beam blanking signals. The video pulse train, minus the beam blanking signals, is applied to the base of an emitter-follower stage. The output from this emitter-follower stage then takes two paths: a first path, known as the short time constant path, which contains a charging circuit having a short time constant; and, a second path, known as the long time constant path, which includes a circuit having a longer time constant than the short time constant path.

A differential switch arrangement is provided and the output from the output stage is controlled by both the short time constant path and the long time constant path circuits.

If the base of the output transistor is more negative than either of the transistors associated with the short and long time constant paths, then an output is derived. If, however, either of the signals on the bases of the transistors of the differential switch associated with the short and the long time constant paths, becomes more negative than the signal on the base of the output transistor, then the output is inhibited during the time that either of the signals from the time constant circuits to the bases of their associated transistors of the differential switch are more negative. The short time constant circuit is capable of providing quick recovery between closely spaced sampled points of a character. As the scanning process continues, while a point of the character is engaged by the scanning beam, the scanning beam output voltage may not return to a base level before a second or subsequent point is engaged by the scanning beam. Thus, two small "peaks," indicating two intersections of the scanning beam and a portion of the character, will be represented by one generally larger waveform. The long time constant circuit is particularly useful for deriving an intelligible signal from a character containing background smudge. In effect then, the long time constant circuit eliminates the background smudge and permits accurate identification of the scanned character.

Means are also provided in the differential switch for setting a base level to inhibit noise signals. This is accomplished by providing a transistor having its emitter coupled to the differential switch and its base coupled to a potentiometer for setting the level of the output signal.

Further features and objects of the invention will be found throughout the more detailed description and a better understanding of the invention will be afforded by the following detailed description considered in conjunction with the accompanying drawings in which.

Figures 1, 2:
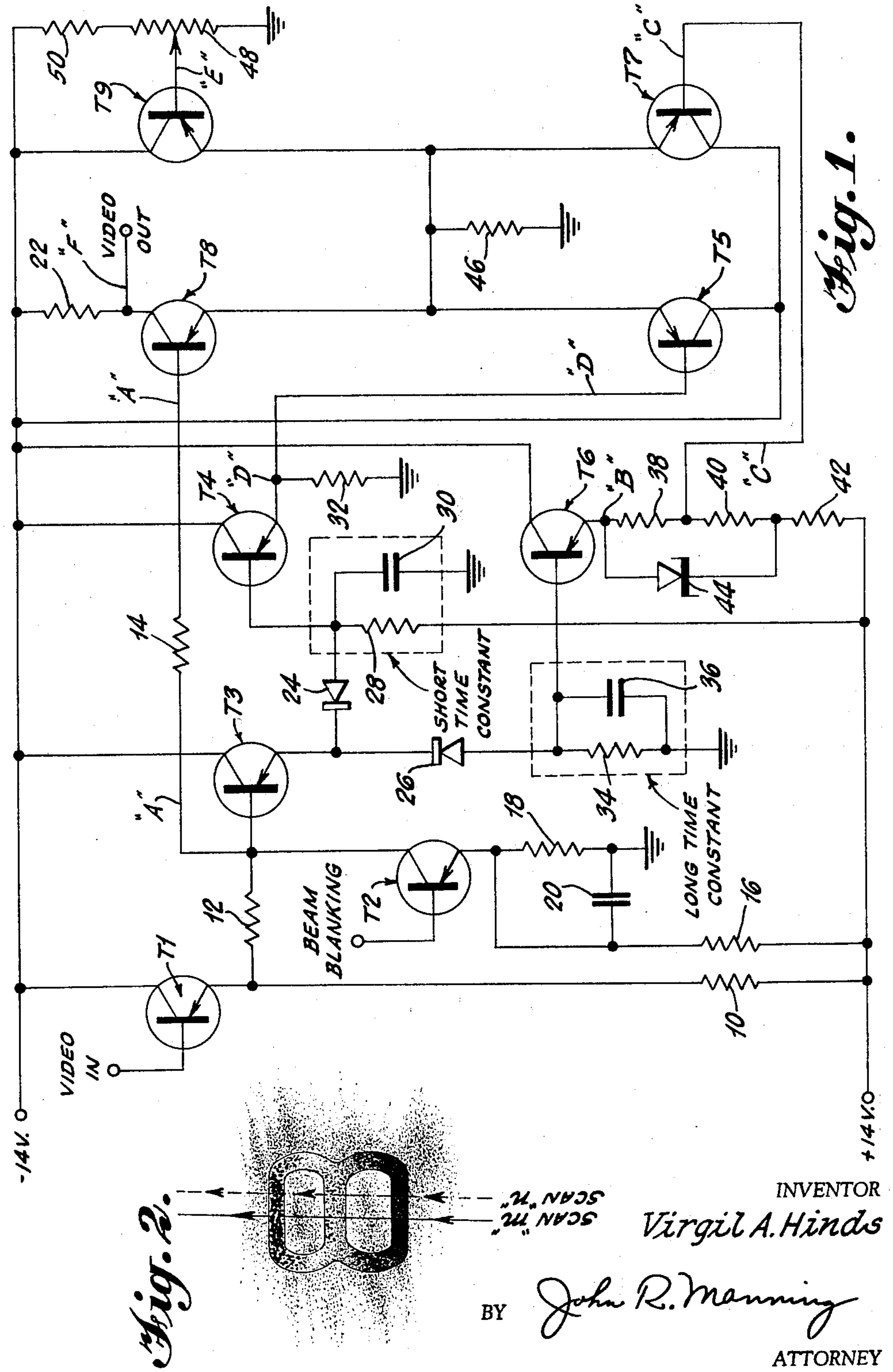
FIGURE 1 is an electrical schematic diagram of the present invention.
FIGURE 2 is an example of the scanning of a character having a great deal of background smudge and closely spaced sampling spots.

As shown in the FIGURE 1, a transistor T1 receives the input video signal on its base, as shown. A negative biasing voltage, such as −14 volts, is applied directly to the collector of T1 and a positive voltage, such as +14 volts, is applied to the emitter of T1 through a resistor 10. The transistor T1 operates in an emitter-follower manner with its emitter coupled both to the base of a transistor T3 and the collector of a transistor T2, through a resistor 12. In addition, the signal on the emitter of T1 through the resistor 12 is applied to the base of the video output transistor T8 through a resistor 14, to be subsequently described.

The emitter of the transistor T2 has a pair of resistors 16 and 18 coupled in parallel fashion to the source of positive voltage and to ground, respectively. In parallel with the resistor 18 is a capacitor 20. These elements act to provide rapid response for the transistor T2 which transistor acts as a blanking switch. Beam blanking signals applied to the base of the transistor T2 will cause T2 to conduct to the point of saturation and shunt the blanking pulse from the video pulse train as it is applied to the transistor T1. The blanking pulse, as is commonly known, is the signal applied during retrace time to inhibit the scanning beam of the camera tube. The beam blanking signals contain no information as to the character scanned, except, perhaps, to provide a means for distinguishing between scans, and thus, may be removed. The transistor T2 is driven on by the beam blanking signals applied to its base only during the presence of beam blanking signals in the video pulse train. When the video signals appear on the emitter of T1, the beam blanking switch T2 is off, thus, permitting the video pulse train to continue through the circuit.

The transistors utilized in the circuit of the present invention are of the PNP type; however, it will be understood that transistors of the NPN configuration could be utilized by changing the collector and emitter voltages. Thus, the negative biasing voltage, for example, minus 14 volts, is applied to the collectors of all of the transistors T1 through T9 except T2. In the case of the output transistor T8, a resistor 22 is inserted between the collector and the negative voltage, thus providing a means across which an output signal can be derived.

The transistor T3 operates in an emitter-follower manner and its output is directed into two paths: a first path which contains elements providing a short time constant and a second path which includes elements providing a long time constant. These two paths operate in parallel to control the output from the output stage T8. The short time constant circuit is operative to provide recovery between closely spaced pulses derived as a result of scanning elements of a character which are closely spaced. The long time constant circuit is extremely useful for "eliminating the background smudge" by being able to differentiate between a portion of a character and a portion of smudge or smear on the document located within or near the character being scanned.

The operation of the short and long time constant circuits follow the general rules relating to circuits of this type and a detailed explanation is not believed necessary here. Suffice it to say, both circuits are charged up (signal peak stored on capacitors 30 and 36) by the same signal. When the charging signal decreases in amplitude the circuits will discharge with the short time constant circuit discharging before the long time constant circuit. The discharge of these circuits will alter the output of the transitsor associated with the respective time constant circuit since the circuits are coupled to the bases of the transistors T4 and T6.

The output from the emitter of the transistor T3 is applied in parallel manner to the cathodes of diodes 24 and 26. The anode of the diode 24 is coupled to the short time constant elements comprising a resistor 28 and a capacitor 30. The other end of the resistor 28 is coupled to the source of positive voltage while the opposite end of the capacitor 30 is connected to ground. The base of a transistor T4 is connected to the diode 24, the resistor 28 and the capacitor 30. The emitter of the transistor T4 provides an output to the base of the transistor T5, which will hereinafter be discussed. The emitter of the transistor T4 is connected to ground through a resistor 32.

The long time constant path comprising a resistor 34 and a capacitor 36 has one end connected to the anode of the diode 26 and the base of a transistor T6. The opposite ends of the resistor 34 and the capacitor 36 are connected to ground. Series resistors 38, 40 and 42 are connected between the emitter of the transistor T6 and the positive biasing voltage. At the point between the resistors 38 and 40, the signal is taken on a conductor to the base of the transistor T7 which may, under certain circumstances, control the output of the amplifying stage T8. The cathode of Zener diode 44 is connected to the point between the junction of the resistors 40 and 42. The anode of Zener diode 44 is connected to the emitter of the transistor stage T6. The Zener diode 44 is effective to add approximately three volts positive to the emitter of T6.

The output circuit comprises the amplifier T8 which is controlled by the transistors T5, T7 and T9. The emitters of the transistors T5, T7, T8 and T9 are coupled in common to ground through a resistor 46. Transistor T5 is driven on its base from the emitter of transistor T4 and the waveform on this conductor is as shown at D, of the FIGURE 3, to be hereinafter discussed. If the base voltage on the video output transistor T8 is more negative than the voltage exemplified by the waveform D on the base of the transistor T5, then an output is produced on the output terminal (the collector) of T8. If, however, the voltage as exemplified by the waveform D on the base of the transistor T5 becomes more negative than the voltage as exemplified by the A waveform on the base of T8, then the transistor T5 will be effective to turn off the transistor T8, which results in no output.

Similarly, the long time constant circuit is coupled via the emitter of the transistor T6 to the base of the transistor T7 and the waveform appearing on this conductor is as shown at C, of the FIGURE 3, to be subsequently discussed. In a like manner, T8 will conduct and produce an output as shown by the waveform F, of the FIGURE 4, as long as the base voltage of T8 is more negative than the base voltage of T7, as exemplified by the waveform C. If waveform C becomes more negative than the voltage appearing on the base of T8, then T7 will be effective to inhibit the output of T8. Of course, the signals on the waveforms C and D are directly related, respectively, to the long time constant elements 34 and 36 and the short time constant elements 28 and 30.

Since the transistors T5 and T7 are commonly connected to control the conduction of T8, it is necessary that the base voltage (waveform A) must be more negative than either the waveforms C and D appearing respectively on the bases of the transistors T7 and T5.

The transistor T9, which may be termed a threshold circuit, determines the minimum switching point of the transistor T8. The transistor T8 switches off for voltages more positive than the base of the transistor T9. The base of the transistor T9 is connected to a potentiometer 48 which may be manually adjusted to the desired level. One end of the potentiometer 48 is connected through a resistor 50 to the negative voltage supply and the other end of the potentiometer 48 is coupled to ground. The circuit comprising the transistor T9 and the potentiometer 48 affords a means of excluding portions of the video waveform likely to be noisy.

The operation of the circuit is best described by reference to the FIGURES 2, 3 and 4, in addition to the FIGURE 1. The designation of the waveforms is as follows:

Waveform A: This is the waveform derived as a result of the scan *m* of the character 8, which is shown in the FIGURE 2 and including the smears and smudges located within the character. This waveform is the video signal applied to the bases of the transistors T3 and T8.

Waveform B: This is the waveform derived at the emitter of the transistor T6 and shows how the original signal A has been affected by the long time constant circuit elements.

Waveform C: This waveform is similar to waveform B except that the Zener diode 44 has translated the waveform B more positive by approximately three volts so that the waveform now appears at C in the FIGURE 3.

Waveform D: This is the waveform which appears on the emitter of the transistor T4 and applied to the base of the transistor T5. The original waveform or waveform A now appears as waveform D as affected by the short time constant circuit elements 28 and 30 associated with the base of the transistor T4.

Waveform E: This "waveform" is merely a D.C. level applied to the base of the transistor T9 which provides a means of excluding portions of the video waveform A likely to be noisy.

Waveform F: This is the waveform as shown in the FIGURE 4 which is derived at the video output terminal on the collector of the transistor T8. It will be noted that the short and long time constant elements operate to transform the original video waveform A having components of noise, signals produced by smeared or smudged areas, sloping leading and trailing edges, and the like, into three sharp and distinct pulses indicative of the interception of the scan "*m*" as it passed over the three horizontal bars comprising the intersection of the scan with these areas as shown in the FIGURE 2.

Figure 3:
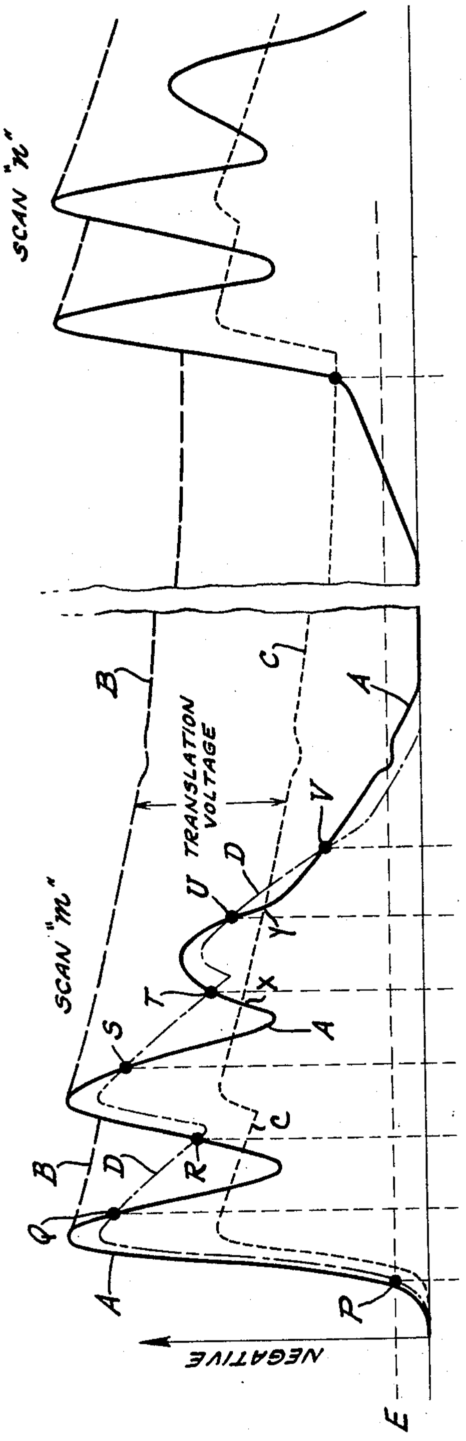
FIGURE 3 shows the waveforms at various points in the circuit.

Observation of waveform A shown in the FIGURE 3 discloses that three peaks were obtained as a result of scan *m* of the FIGURE 2, which peaks correspond in number to the horizontal bars encountered in the scan of the digit 8. However, it will be noted that after the first peak was generated, waveform A did not return to a base level. This was due to the smear or smudge between the first and second horizontal bars of the character and in addition to the interelectrode and intercircuit capacitance of the system. Similarly, after the second peak was generated, it will be noted that the waveform again did not return to a base level. Also, when the scan intercepted the uppermost horizontal bar of the character of the FIGURE 2, a reduced output was derived as shown by the third peak of the waveform A. This was due to the lightness of the third horizontal bar as compared to the darkness of the lower horizontal bars of the character. If the circuit of the present invention is to be effective to indicate an intelligible signal, then the output on the video out terminal of the transistor T8 should show three sharply defined and distinct pulses, which indicate three interceptions of the scanning beam with portions of the character.

The waveform A is applied to the bases of the transistors T3 and T8. It will be remembered that the transistor T8 conducts and produces an output only when its base is more negative than the voltages applied to the bases of the transitsors T5, T7 and T9. As the waveform A is applied to the base of the transistor T8, the base voltage (waveform E) of the transistor T9 has been set at a value to exclude the portion of the video waveform likely to be noisy which, as shown in the FIGURE 3, is that portion of the waveform located between the reference line and the level indicated by E.

It will be noted that FIGURE 3 is drawn in such a manner that the waveforms are negative going as they rise upwardly which is in opposition to the usual practice of representing negative-going waves as they move downwardly or away from the base line. For purposes of simplicity and ease in drawing, the waveforms of FIGURE 3 have been reversed by 180° while the waveforms of the FIGURE 4 are shown conventionally as positive-going waves as they rise upwardly away from the base or reference level. If one wishes to change the representation of FIGURE 3 to the conventional showing, then one might picture the output from the emitter of the transistor T1 being applied to an inverter circuit and thus produce waveforms having conventional representation. In addition, an inverter circuit must be then coupled to the video output on the collector of the transistor T8 to arrive at the conventional configuration shown in the FIGURE 4.

As the waveform A is applied to the base of the transistor T8, it is also applied to the short time constant elements associated with the transistors T3 and T4 and the long time constant elements associated with the transistors T3 and T6. It will be noted that waveform D, as shown in the FIGURE 3, will be applied to the base of the transistor T5. In addition, waveform C, as shown in FIGURE 3 will be applied from the transistor T6 to the base of the transistor T7.

As shown in the FIGURE 3, the waveform B (and, of course, the waveform C), since it is associated with the long time constant circuit elements, changes at a much slower rate than the waveform D, since the waveform D is associated with the short time constant circuit elements 28 and 30. It will be noted from FIGURE 3 that the waveform B did not respond to the third peak; however, the waveform B has been reduced in amplitude (translated less negative) by the Zener diode 44 of the FIGURE 1 and is shown now as the waveform C. The waveform C now exhibits a value less than the third peak so that the third peak can be detected. Without the short time constant waveform D, the output transistor would commence conduction at the point X and reproduce the waveform A until the point Y. However, the short time constant waveform D will preserve the width intelligence of the signal (the small third peak) and permit an output only from the point T to the point U. From this example, the advantage of the short time constant circuit will be readily discernible.

A particular advantage of the long time constant circuit will be particularly noted by inspecting the point V which is the last intersection of the waveforms A and D. It will be seen that the output from the transistor T8 could be produced and give a spurious indication of a waveform as shown dotted in the FIGURE 4 except that a long time constant circuit ignores the smudge and smears of the character which caused this elevation of the waveform from its base line, and holds the transistor T8 in a nonconducting condition so that three voltage peaks are accurately amplified and accurately represent the three intersections of the scanning beam while scanning the character of the FIGURE 2.

The operation of the circuit will be simplified if it is remembered that an output signal F is derived from the transistor T8 only when the signal A applied to the base of T8 is more negative than the signals D, C, and E, applied, respectively, to the bases of the transistors T5, T7, and T9. As shown in the FIGURE 3, the waveform A is reproduced as an output from the point P to the point Q. (See also points P′ and Q′ of FIGURE 4.) At the point Q, the short time constant circuit (waveform D) has discharged at such a rate that the base voltage of the transistor T5 becomes more negative than the waveform A applied to the base of T8, so that T8 immediately turns off and the output shown at Q′ of the FIGURE 4 immediately drops to the reference level. The output signal remains off until the point R is reached, which means that the base voltage of the transistor T8 has become more negative than any of the other transistors T5, T7 or T9. As a result, the output signal F immediately rises to the point R′ of the FIGURE 4. The original waveform A is then reproduced at the output of T8 until the point S is reached. At point S, the voltage on the base of T5 again becomes more negative than the voltage on the base of T8 thus causing T8 to be cut off and its output returned to a base or reference level. At the point T, the waveform A on the base of T8 again becomes more negative than the base voltages of the other transistors associated with the differential switch and produces an output. The waveform A is then reproduced until the point U is reached. It will be noted that the long time constant circuit (the waveforms B and C) has missed this third peak but the short time constant circuit (the waveform D) has been effective to preserve the third peak, which is shorter than the first two peaks.

At the point U the output is inhibited since the base voltage of T5 becomes more negative than that of T8 and the output waveform F returns to its reference level.

Thus far, the short time constant circuit has been effective to transform the input video signal into three sharply defined pulses indicating three "hits" of the scanning beam with portions of the character. At this point, in this example, toward the end of the waveform A, the long time constant circuit comes into play. At the point V, the waveform A becomes more negative than the waveform D and would turn the transistor T8 on and produce a spurious pulse except that the waveform C remains more negative (a more negative signal is applied to the base of the transistor T7 than to the base of the transistor T8) thus taking over control and causing T8 to remain off. The effectiveness of the long term constant circuit in "eliminating" the smudges and smears located near or within the character, has thus been shown to be highly effective.

Figure 4:
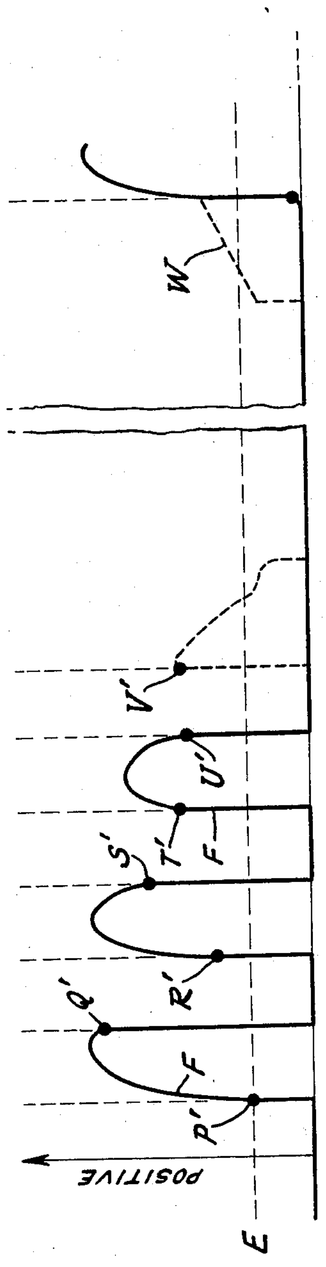
FIGURE 4 shows the output waveform of the present invention.

Scan *n* is partially shown in the right portion of the FIGURES 3 and 4. This scan of the FIGURE 2 is similar to that of scan *m*. For this reason, it is not believed necessary to show in detail the response of the circuits associated with scan *n*.

In addition to the foregoing, a number of interesting points may be noted. In the FIGURE 4, the waveform prior to the point P′ exhibits the removal of the background camera noise, and the like, by the proper setting of the potentiometer 48 associated with the base of the transistor T9.

Further observations are:

The waveform A did not return to the base level between the peaks due to the smudge between the horizontal bars of the character.

The third peak of the waveform A exhibits the reduced output from a lighter portion of the character (the top horizontal bar) than the first or second portions of the character that were scanned.

It will be noted that the long time constant circuit output, as shown by the waveform B, was translated to the waveform C and could have responded to the third peak; however, the third peak was reproduced more accurately by responding to the short time constant output as shown by the waveform C, which more accurately preserved the width intelligence of the signal than if the output had responded to and produced the wide signal from points X to Y. The dotted wave shown near the designation V′, a spurious pulse, would have been reproduced at the output except that the long time constant waveform C took over and remained more negative (the base voltage) to keep the transistor T8 from producing an output as a result of this background noise encountered by the scan.

And, a last observation is that in the scan *n*, at the point W of the FIGURE 4, the long time constant path (the waveform C), by making the base voltage of the transistor T7 more negative than the base voltage of the transistor T8, has held T8 in a nonconducting condition so that the smudge below the character of the FIGURE 2 on the subsequent scan was not reproduced as an information pulse.

Thus, there has been described a video circuit which is particularly effective for deriving information pulses from a video pulse chain which contains information indicative of smudges and smears of the character and has preserved information peaks which are closely spaced which might otherwise be lost. The video waveform is applied to one transistor of a four-transistor differential switch and the output transistor to which the video wave train is applied, will conduct only during that portion of the cycle in which its base voltage is more negative than the base voltages of the other three transistors. One transistor of the group of four transistors is utilized as a means for excluding portions of the video waveform which are noisy. A third transistor of the group of four transistors is controlled by a short time constant circuit while the fourth transistor of the group of the four transistors is controlled by a long time constant circuit. The circuits controlled by the short time constant path and the long time constant path, by their circuit arrangements with the output transistor, will control the output transisor in such a manner that each encounter of the scanning beam of the camera tube with a portion of the character will be displayed as a sharply rising pulse and the background noise or smudge of the character will be effectively removed. In addition, closely spaced information pulses, which will otherwise be lost or be displayed as a single pulse, are accurately reproduced at the output transistor each time the scanning beam encounters a portion of a character. The circuit is capable of compensating for the lighter and darker areas forming portions of the character to produce a usable output during each sweep of the camera beam.

The present invention may be embodied in other specific forms without departing from the spirit and essential characters of my invention. The present embodiment is, therefore, to be considered in all respects as illustrative and the scope of the invention being indicated by the appended claims rather than by the foregoing description, and all changes which come within the meaning and range of the equivalency of the claims are therefore intended to be embraced therein.

What is claimed is:

1. A video amplifying circuit comprising, a plurality of transistor stages each including a transistor having base, emitter and collector electrodes, a first transistor stage for receiving signals on the base of the transistor included in said first stage, a transistor output stage coupled to the emitter of said transistor of said first stage, a first controlling network coupled between the emitter of said transistor of said first stage and said transistor of said output stage, a second controlling network coupled in parallel to said first controlling network, source means connected to the collectors of each of said transistors and an output terminal coupled to said transistor of said output stage, said controlling networks effective to permit amplification of certain portions of the received signals.

2. An amplifying circuit for converting a video signal into a signal having substantially two significant levels comprising an input stage for receiving signals, an output stage including a transistor having a base, an emitter and a collector, means coupling the input stage to the base of said transistor of said output stage, a first charging network coupled to said input stage, a transistor stage including a transistor having base, emitter and collector electrodes, said transistor having its base connected to said first charging network and its emitter coupled to said emitter of said transistor of said output stage, a second charging network coupled to said input stage, and a further transistor stage including a transistor having base, emitter and collector electrodes, said transistor having its base connected to said second charging network and its emitter coupled to said emitter of said output stage, means connecting the emitter of said output transistor and the collectors of the other of said transistors to voltage sources said first and said second charging networks effective for controlling said output stage for deriving a substantially two-level signal at the collector of said transistor of said output stage.

3. The combination as defined in claim 2 including means coupled to said input stage for removing selected portions of the video signal.

4. The combination as defined in claim 2 including a threshold transistor stage including a transistor having base, emitter and collector electrodes, said transistor having its emitter coupled to the emitter of said transistor of said output stage for controlling the level at which said output stage conducts.

5. The combination as defined in claim 4 wherein said first charging circuit has a shorter time constant than said second charging circuit.

6. An electronic switch comprising a group of transistors with base, emitter, and collector electrodes, said transistors having their emitters coupled in common, one transistor of said group being designated the output transistor which conducts, to transform a video waveform into a signal having substantially two levels, only when its base voltage is more negative than the base voltage of all other transistors of the group, a first charging circuit coupled to the base of one of the transistors of the group for controlling the output transistor for short periods of time, a second charging circuit coupled to the base of another of the transistors of the group, and means to apply a video signal to the base of said output transistor and said first and said second charging circuits, voltage source means connected between the collectors and emitters of each of said transistors.

7. The combination as defined in claim 6 wherein said first charging circuit comprises a shorter time constant circuit than said second charging circuit.

8. A video evaluation circuit comprising, a plurality of transistors, a first transistor for receiving video signals, means for selectively shunting portions of said video signals, said means for shunting connected to said input transistor, first energy storage means, second energy storage means having a rate of deenergization different from said first storage means, said first and second energy storage means connected to said input transistor and said means for shunting, a second transistor connected to one of said storage means, a third transistor connected to the other of said storage means, threshold means for supplying a predetermined signal value, and an output transistor connected to said input transistor, said second transistor, said third transistor and said threshold means, said output transistor producing an output signal only in the presence of an input signal having a magnitude greater than the magnitude of the signals supplied by said second and third transistors and said threshold means.

9. The circuit recited in claim 8 wherein said energy storage means include resistors and capacitors and wherein said second transistor said third transistor and said threshold means are connected to the same electrode of said output transistor.

10. A video evalution circuit comprising, a plurality of transistors, a first transistor for receiving video signals, means for selectively shunting portions of said video signals, said means for shunting connected to said input transistor, first energy storage means, second energy storage means having a rate of deenergization different from said first storage means, said first and second energy storage means connected to said input transistor and said means for shunting, a second transistor connected to one of said storage means, a third transistor, potential shifting means connected between said second energy storage means and said third transistor, threshold means for supplying a predetermined signal value, and an output transistor connected to said input transistor, said second transistor, said third transistor and said threshold means, said output transistor producing an output signal only in the presence of an input signal having a magnitude greater than the magnitude of the signals supplied by said second and third transistors and said threshold means.

11. The circuit recited in claim 10 including a fourth transistor connected between said first energy storage means and said second transistor, and a fifth transistor connected between said second energy storage means and said potential shifting means.

References Cited by the Examiner

UNITED STATES PATENTS

| | | | |
|---|---|---|---|
| 2,591,088 | 4/1952 | Millman et al. | |
| 3,061,671 | 10/1962 | Waller. | |
| 3,159,815 | 12/1964 | Groce | 340—146.3 |

ARTHUR GAUSS, *Primary Examiner.*

S. D. MILLER, *Assistant Examiner.*